United States Patent
Lewis et al.

(10) Patent No.: US 11,759,840 B2
(45) Date of Patent: Sep. 19, 2023

(54) MODULAR ROLLER HEMMING SYSTEM HAVING AN ADDITIVE MANUFACTURED ANVIL

(71) Applicant: GM Global Technology Operations LLC, Detroit, MI (US)

(72) Inventors: Jennifer Lewis, Chesterfield, MI (US); Ronald J. Leslie, Washington Township, MI (US); Lawrence A. Adamski, Linden, MI (US); Malini Dusey, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 17/189,793

(22) Filed: Mar. 2, 2021

(65) Prior Publication Data

US 2022/0280993 A1    Sep. 8, 2022

(51) Int. Cl.
 *B21D 37/02* (2006.01)
 *B21D 37/01* (2006.01)
 *B33Y 80/00* (2015.01)

(52) U.S. Cl.
 CPC ............ *B21D 37/02* (2013.01); *B21D 37/01* (2013.01); *B33Y 80/00* (2014.12)

(58) Field of Classification Search
 CPC ........ B21D 37/02; B21D 37/01; B21D 37/10; B21D 39/02; B21D 39/021
 USPC .......................................................... 72/312
 See application file for complete search history.

(56) References Cited

U.S. PATENT DOCUMENTS

| | | | | |
|---|---|---|---|---|
| 6,439,371 B1* | 8/2002 | Baulier | ................ | B21D 39/021 901/6 |
| 6,619,096 B1* | 9/2003 | Hartley | ................ | B21D 39/021 29/243.58 |
| 2010/0319430 A1* | 12/2010 | Campian | ................ | B21D 43/18 72/293 |
| 2013/0140419 A1* | 6/2013 | Kim | ..................... | B21D 39/021 248/309.3 |
| 2016/0158824 A1 | 6/2016 | Yoon et al. | | |
| 2018/0361453 A1 | 12/2018 | Horike et al. | | |

FOREIGN PATENT DOCUMENTS

| | | |
|---|---|---|
| CN | 109513838 A | 3/2019 |
| DE | 102012210537 A1 | 4/2013 |
| EP | 2520383 A1 | 11/2012 |
| WO | 2016152968 A1 | 9/2016 |

* cited by examiner

*Primary Examiner* — Teresa M Ekiert
(74) *Attorney, Agent, or Firm* — Vivacqua Crane, PLLC

(57) ABSTRACT

A modular roller hemming system having a base assembly, a replaceable anvil, a spider arm assembly, a plurality of support arms for supporting the spider arm assembly, and a plurality of repositionable unit tools. The anvil is 3-D printed of a polymer composite material and may be replaced with similarly manufactured anvils having different form factors for receiving various shaped and dimensioned workpiece assemblies. The plurality of support arms are repositionable on the base assembly, the spider arm assembly is reconfigurable, and the plurality of unit tools are moveable to accommodate various anvils having different form factors. The support arms includes an upper segment that is detachable from the lower segment to facilitate the changeover of anvils.

13 Claims, 5 Drawing Sheets

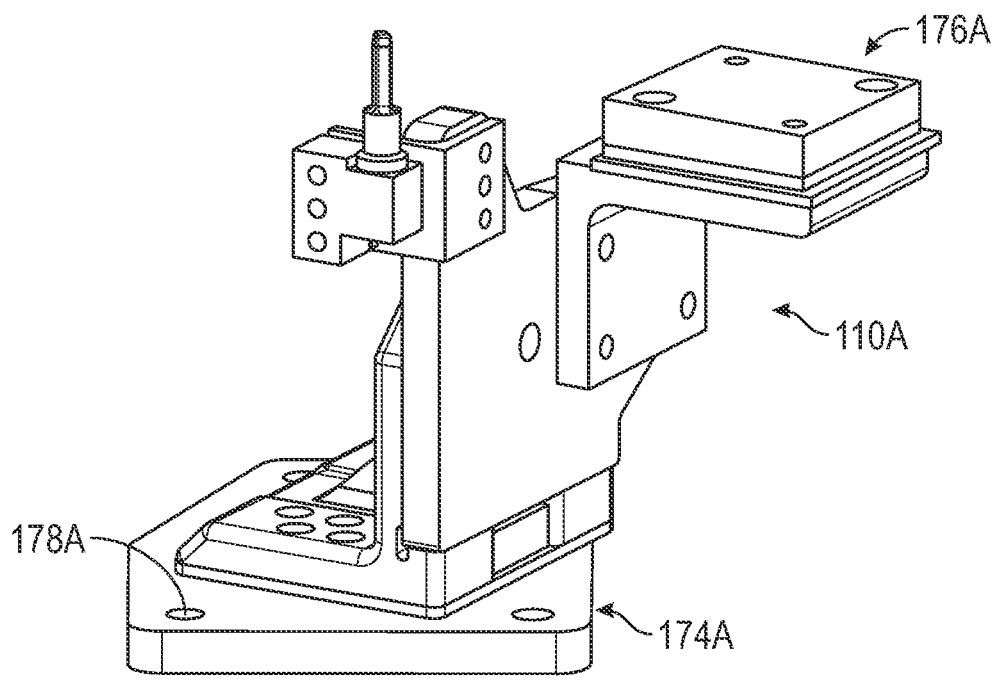
FIG. 6
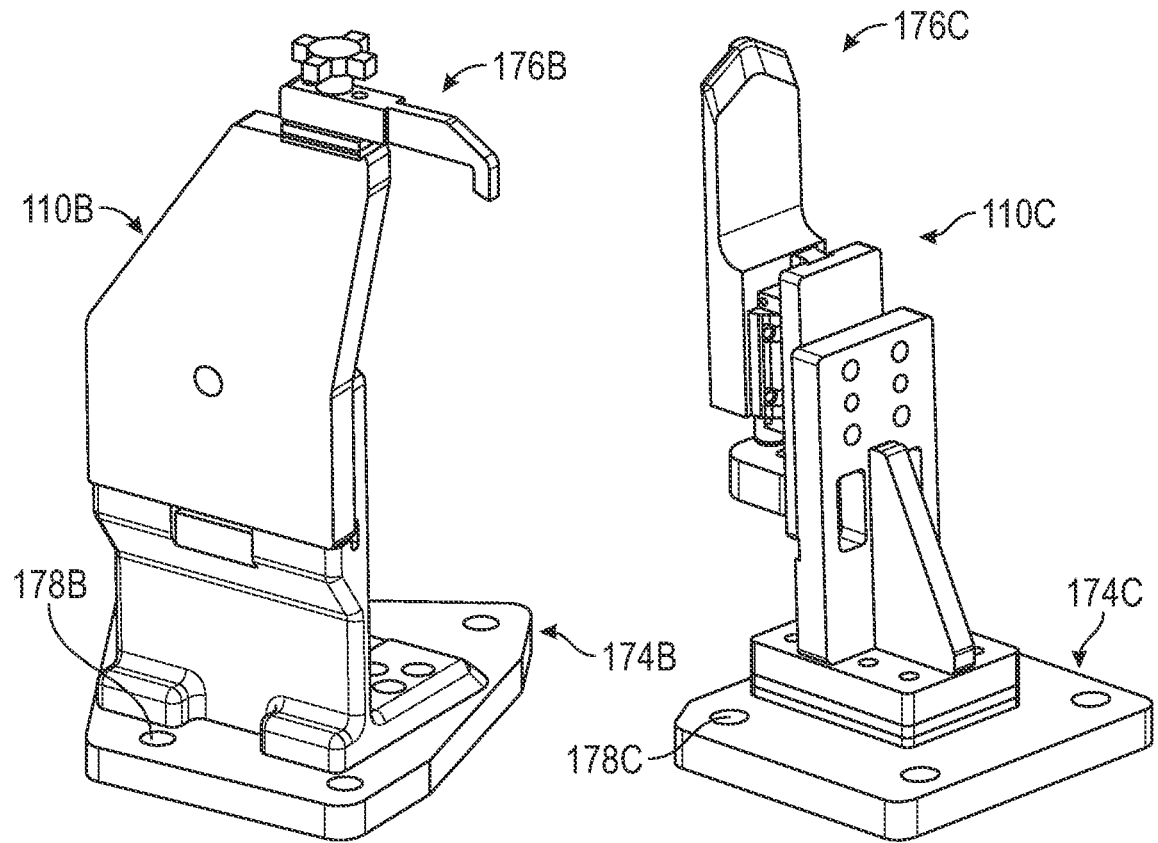
FIG. 7
FIG. 8

MODULAR ROLLER HEMMING SYSTEM HAVING AN ADDITIVE MANUFACTURED ANVIL

INTRODUCTION

The present disclosure relates to roller hemming systems, more particularly to a modular roller hemming system having an additive manufactured anvil.

Roller hemming is known to be used in the automotive industry to join the edges of inner and outer body panels to form a vehicle swing metal closure panel assembly, such as door assembly, hood lid assembly, and trunk lid assembly. For example, in joining an inner and outer panels of a vehicle door assembly by a hemming process, a stamped outer door panel is loaded onto an appropriately shaped anvil and a stamped inner door member is then placed onto the inside of the outer door panel with the edges of the door panels overlying each other. The inner and outer door panels are held in place with a clamp, or other suitable clamping mechanisms, while one or more hemming rollers are moved onto and over the anvil to fold the edges of the outer door panel and inner door member over onto each other to join the outer door panel to the inner door panel. Localized welds, such as spot welds, may be utilized to reinforce the joining strength of the hemmed surfaces.

Traditional anvils used in such a roller hemming process for the joining of vehicle swing metal closure panel assemblies and other vehicle panel assemblies typically are typically made of a metal alloy, such as steel. Such anvils are casted or forged of the metal alloy and are shaped to a predetermined form factor and tolerances by subtractive manufacturing, such as cutting, grinding, honing, polishing, etc. Due to the size and weight of such metal anvils, the associated supporting structures and clamping mechanisms are welded and/or otherwise permanently attached to the finished metal anvil.

New anvils including associated support and clamping mechanisms would need to be manufactured for changeover of vehicle panel assemblies having different form factors. The manufacturing of each anvil is both time and cost intensive, and therefore, may not be applicable for prototypes or limited run vehicle panel assemblies. Thus, while known roller hemming systems having a metal alloy anvil achieve their intended purpose, there is a need for a roller hemming system that is flexible and cost economical for accommodating changeover of vehicle panel assemblies having different form factors.

SUMMARY

According to several aspects, a modular roller hemming system is provided. The system includes a base assembly having a work platform, wherein the work platform defines a plurality of through-holes in a grid pattern; an anvil having a plurality of mounting feet, wherein at least one of the plurality of mounting feet defines a plurality of through-holes alignable with a corresponding plurality of through-holes of the work platform when the anvil is disposed on the anvil; a spider arm assembly spaced from the work platform, wherein the spider arm assembly includes a plurality of adjustable fingers that are configured to maintain the anvil in a predetermined position on the work platform; and at least one support arm having a first end mountable to the base assembly and an opposite second end mountable to the spider arm assembly.

In an additional aspect of the present disclosure, the base assembly includes a plurality of mounting brackets and the first end of the support arm is selectively mountable to any one of the mounting brackets of the base assembly.

In another aspect of the present disclosure, the spider arm assembly includes a plurality of mounting brackets and the second end of the support arm is selectively mountable to any one of the mounting brackets of the spider arm assembly.

In another aspect of the present disclosure, the spider arm assembly includes a frame structure having a plurality of interconnecting members, and a plurality of adjustable fingers extending from the interconnecting members, wherein at least one of the plurality of adjustable fingers is repositionable along the interconnecting members.

In another aspect of the present disclosure, the support arm includes a first arm segment and second arm segment. The first arm segment is selectively detachable from the second arm segment.

In another aspect of the present disclosure, the anvil includes a first surface defining a predetermined form factor to receive a workpiece assembly; an second surface opposite the first surface, wherein the second surface defines a base; and a first side surface interconnecting the first surface and the second surface, wherein the side surface defines at least one mounting feet having a plurality of mounting holes alignable with a corresponding plurality of through-holes of the work platform.

In another aspect of the present disclosure, the anvil further includes a second side surface opposite the first side surface, wherein the second side surface defines a plurality of certification features.

In another aspect of the present disclosure, the anvil further includes a plurality of 3-D printed layers of a polymer composite.

In another aspect of the present disclosure, the polymer composite includes a Nylon-12 and a carbon fiber.

In another aspect of the present disclosure, the system further includes at least one repositionable tool unit having a foot pad defining a plurality of apertures alignable with a corresponding plurality of through-holes on the work platform.

According to several aspects, an additive manufactured anvil for a work platform having a plurality of through-holes. The anvil includes an anvil body having a first surface defining a predetermine form factor for receiving a workpiece, a second surface opposite the first surface, and a side surface interconnecting the first surface and the second surface; and at least one mounting feet extending from the side surface adjacent the second surface. The at least one mounting feet defines an aperture alignable with a through-hole of the work platform when the at least one mounting feet is positioned onto the work platform.

In an additional aspect of the present disclosure, the anvil further includes at least one certification feature extending from the side surface proximal to the first surface.

In another aspect of the present disclosure, the anvil body, the at least one mounting feet, and the at least one certification feature is a single integral unit comprising a plurality of 3-D printed layers of a polymer composite including a carbon-fiber reinforced thermoplastic, preferably a Nylon-12 and a carbon-fiber.

According to several aspects, a modular roller hemming system having a work platform including a work surface, a support surface opposite the work surface, and a perimeter surface connecting the work surface and the support surface, wherein the work platform defines a plurality of through-holes in a grid pattern extending from the work surface to the support surface; an anvil having first surface configured to receive a workpiece assembly, a base opposite the first surface, and at least one mounting feet extending from the base, wherein the at least one mounting feet defines at least one aperture alignable with at least one of the plurality of through-holes of the work platform; a reconfigurable spider arm assembly having a plurality of adjustable fingers configured to retain the workpiece assembly against the first surface of the anvil; and a plurality of detachable support arms extending from the work platform and supporting the reconfigurable spider assembly.

In an additional aspect of the present disclosure, the work platform includes a plurality of mounting brackets disposed about a perimeter of the work platform. At least one of the plurality of detachable arms is selectively attachable to any one of the mounting brackets.

In another aspect of the present disclosure, the anvil including the at least one feet comprises a plurality of layers of 3-D printed carbon-fiber reinforced thermoplastic.

In another aspect of the present disclosure, the reconfigurable spider assembly includes a frame structure, and the plurality of fingers is repositionable along the frame structure.

In another aspect of the present disclosure, the system further includes at least one tool unit having a foot pad defining a plurality of apertures alignable with a plurality of through-holes on the work platform.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a perspective side view of a pin and rest unit tool, according to an exemplary embodiment;

FIG. 7 is a perspective side view of a clamp unit tool, according to an exemplary embodiment; and FIG. 8 is a perspective side view of a crowder unit tool, according to an exemplary embodiment.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
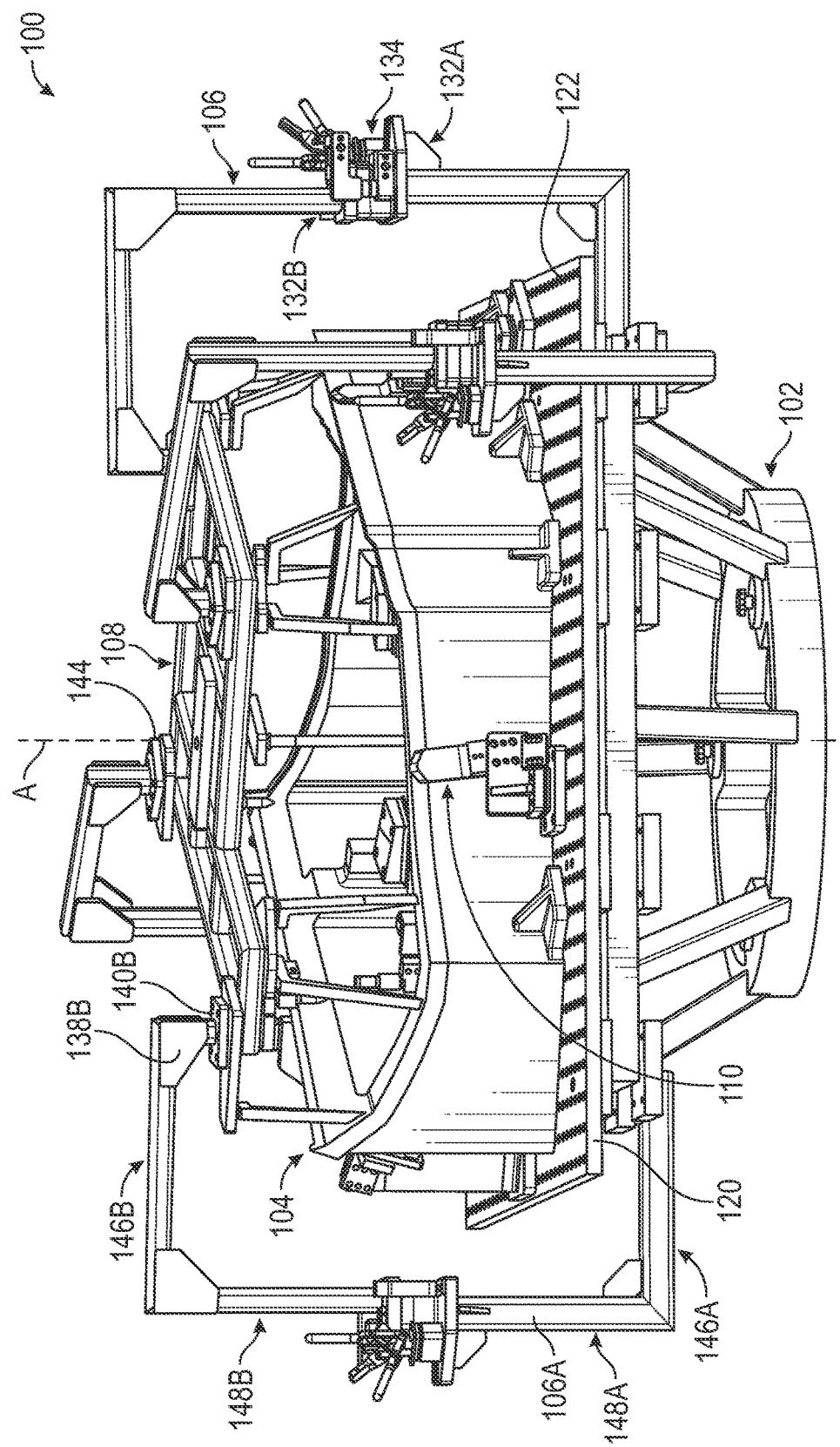
FIG. 1 is a perspective side view a modular roller hemming system, according to an exemplary embodiment.
Figure 2:
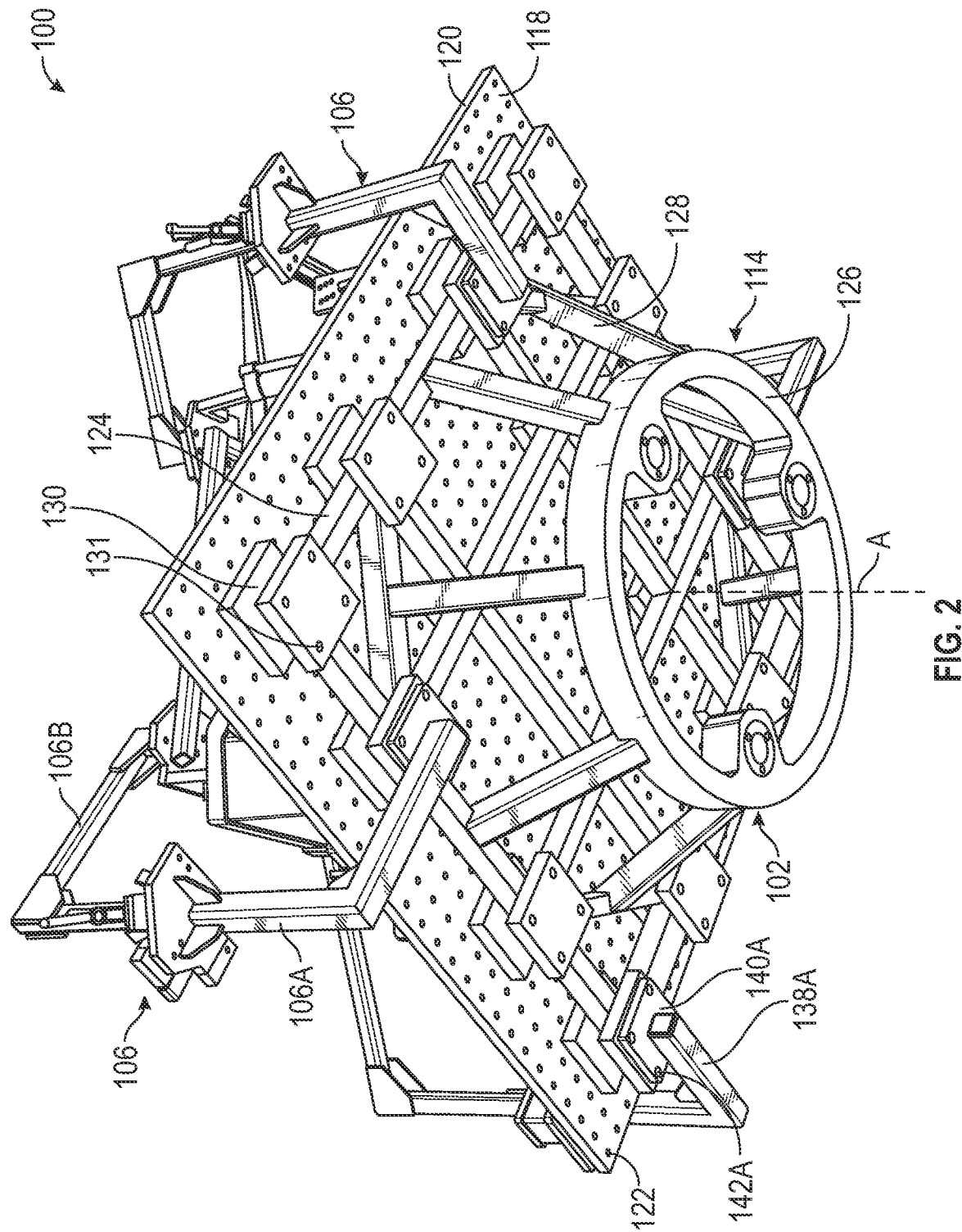
FIG. 2 is a perspective bottom view of the modular roller hemming system of FIG. 1, according to an exemplary embodiment.

FIG. 1, is perspective side view a modular roller hemming system 100. FIG. 2 is a perspective bottom view of the modular roller hemming system 100. Referring to both FIGS. 1 and 2, the modular roller hemming system 100 includes a base assembly 102, an anvil 104, a plurality of support arms 106, a spider arm assembly 108, and a plurality of unit tools 110. The anvil 104 is manufactured of a polymer composite material and may be conveniently changed over with similarly manufactured anvils 104 having different form factors for receiving various shaped and dimensioned workpiece assemblies (not shown). The plurality of support arms 106 are repositionable, the spider arm assembly 108 is reconfigurable, and the plurality of unit tools 110 are moveable to accommodate changeovers of anvils 104. The modular roller hemming system 100 enables an economical and expedient changeover of anvils 104 having different form factors without the usual need of casting/forging and subtractive manufacturing a new anvil. The modular roller hemming system 100 also eliminates the need of replacing the base assembly 102, the spider arm assembly 108, and the plurality of unit tools 110 to accommodate the new anvil.

Figure 3:
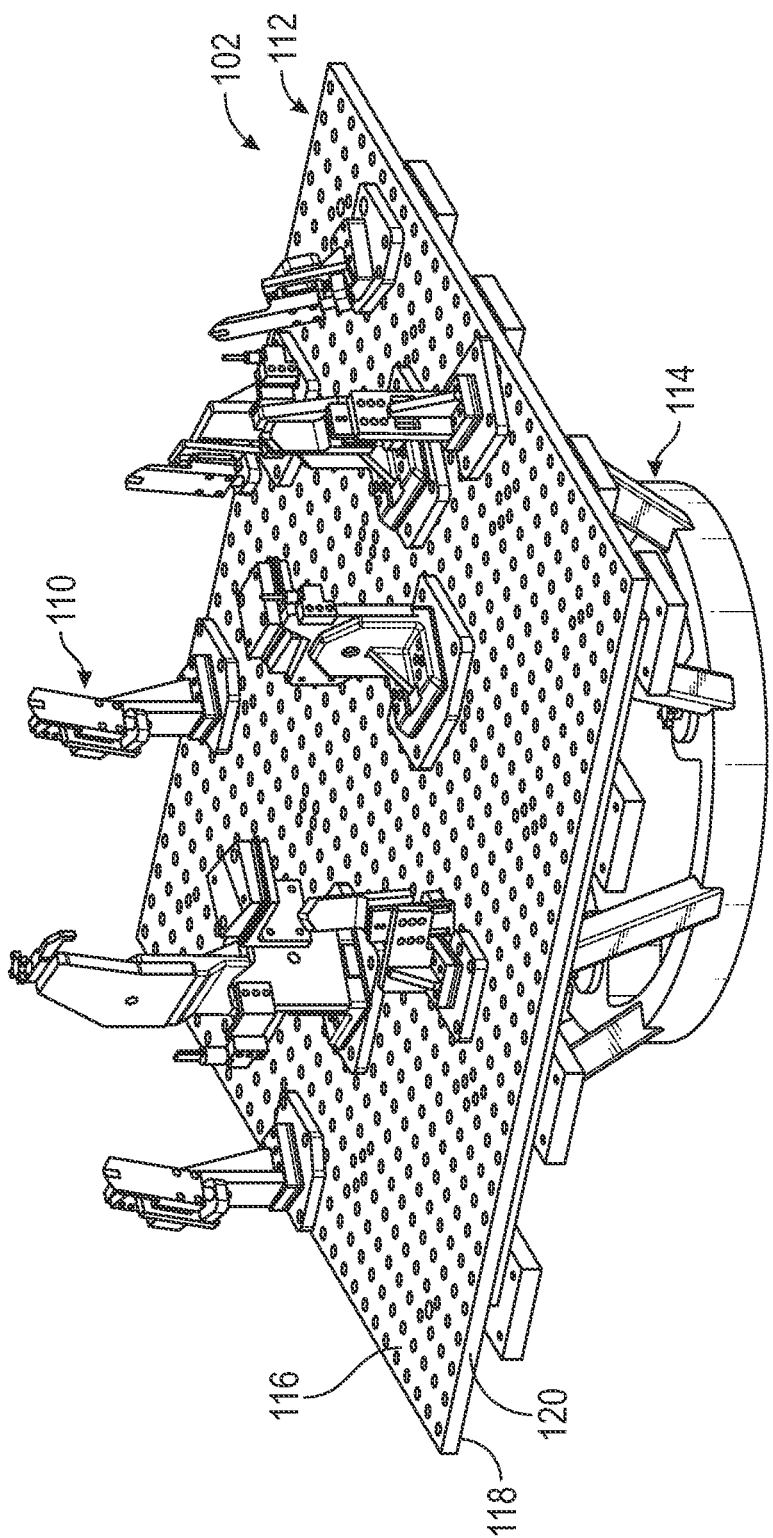
FIG. 3 is a perspective top view of the base assembly having a plurality of unit tools, according to an exemplary embodiment.

FIG. 3 shows a top perspective view of the base assembly 102. Referring to both FIGS. 2 and 3, the base assembly 102 includes a work platform 112 fixed to a support base 114. The work platform 112 includes a first surface 116, a second surface 118 opposite the first surface 116, and a perimeter side surface 120 connecting the first surface 116 and the second surface 118. The perimeter side surface 120 defines a perimeter of the work platform 112. The work platform 112 defines a plurality of through-holes 122 extending from the first surface 116 to the second surface 118. The plurality of through-holes 122 are positioned in a grid pattern having equally spaced through-hole centers throughout the work platform 112.

The support base 114 includes a platform frame 124, a base frame 126 spaced from the platform frame 124, and a plurality of frame members 128 interconnecting the platform frame 124 and the base frame 126, thereby forming an integral and solid support base 114. A plurality of mounting brackets 130 attaches the platform frame 124 onto the second surface of the work platform 112. The mounting brackets 130 are preferably disposed equal distance along the perimeter side surface 120 of the work platform 112. Each of the mounting brackets 130 defines a plurality of mounting bolt holes 131 configured to receive a mounting bolt (not shown).

Each of the support arms 106 includes a lower segment arm 106A, also referred to a first segment arm 106A, and an upper segment arm 106B, also referred to as second segment arm 106B. The lower segment arm 106A and the upper segment arm 106B may be disassembled and separated from each other. The lower segment arm 106A includes a connecting end 132A having a receptacle 134 configured to receive a connecting end 132B of the upper segment arm 106B. The receptacle 134 may include a clamping mechanism 136 or clamping bolts that is operable to lock and unlock the lower segment arm 106A onto the upper segment arm 106B.

The lower segment arm 106A includes a first end 138A opposite the connecting end 132A. The first end 138A includes a mounting bracket 140A that may be selectively mounted, or fixed, to any one of the mounting bracket 130 of the platform frame 124. The mounting bracket 140A includes a plurality of bolt holes 142A corresponding to the bolt holes 131 on the mounting bracket 130. The lower segment arm 106A may be secured to the platform frame 124 with a mounting bolt to join the platform frame 124 mounting bracket 130 and the lower segment arm 106A mounting bracket 140A. Similarly, the upper segment arm 106B includes a second end 138B opposite the connecting end 132B. The second end 138B includes a mounting bracket 140B that may be selectively mounted to any one of a mounting bracket 144 of the spider arm assembly 108 and fixed with a mounting bolt.

Best shown in FIG. 1, the lower segment arm 106A includes a first portion 146A extending radially from a center Axis-A to beyond the perimeter side surface 120 and transitions into a second portion 148A extending parallel to the Axis-A in a direction toward the spider arm assembly 108. Similarly, the upper segment arm 106B includes a first portion 146B extending radially from the center Axis-A to beyond the perimeter side surface 120 and transitions into a second portion 148B extending parallel to the Axis-A in a direction of the base assembly 102.

Figure 4:
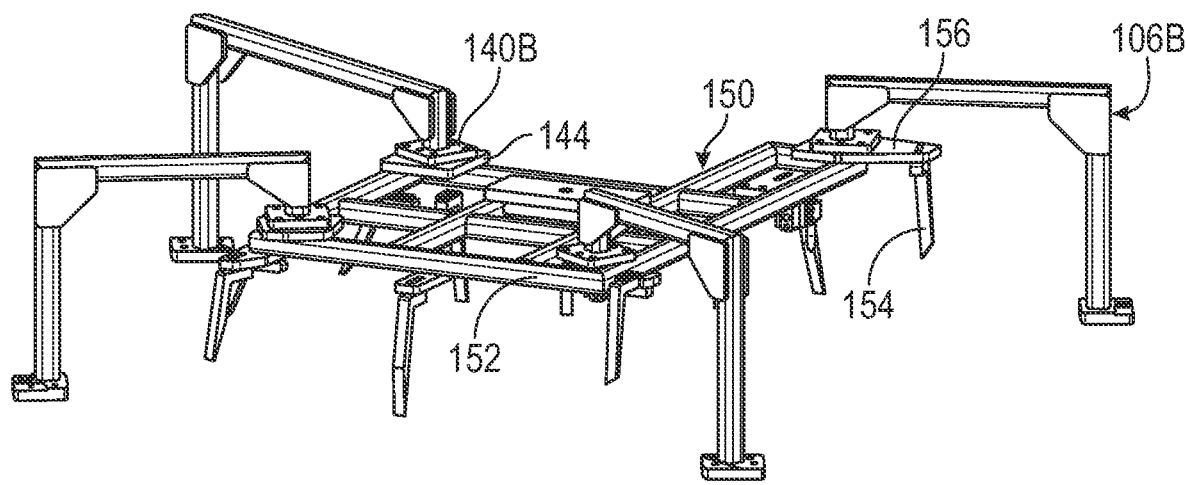
FIG. 4 is a perspective side view of a spider arm assembly attached to an upper segment of a support arm, according to an exemplary embodiment.

FIG. 4 shows the spider arm assembly 108 of the modular roller hemming system 100 attached to the upper segment arm 106B. The spider arm assembly 108 includes a frame structure 150 having a plurality of interconnecting members 152, a plurality of adjustable fingers 154, and a plurality of mounting brackets 156. The plurality of adjustable fingers 154 and mounting brackets 156 may be selectively repositioned and secured along the frame structure 150 to accommodate various sizes and form factors of the anvil 104.

Figure 5:
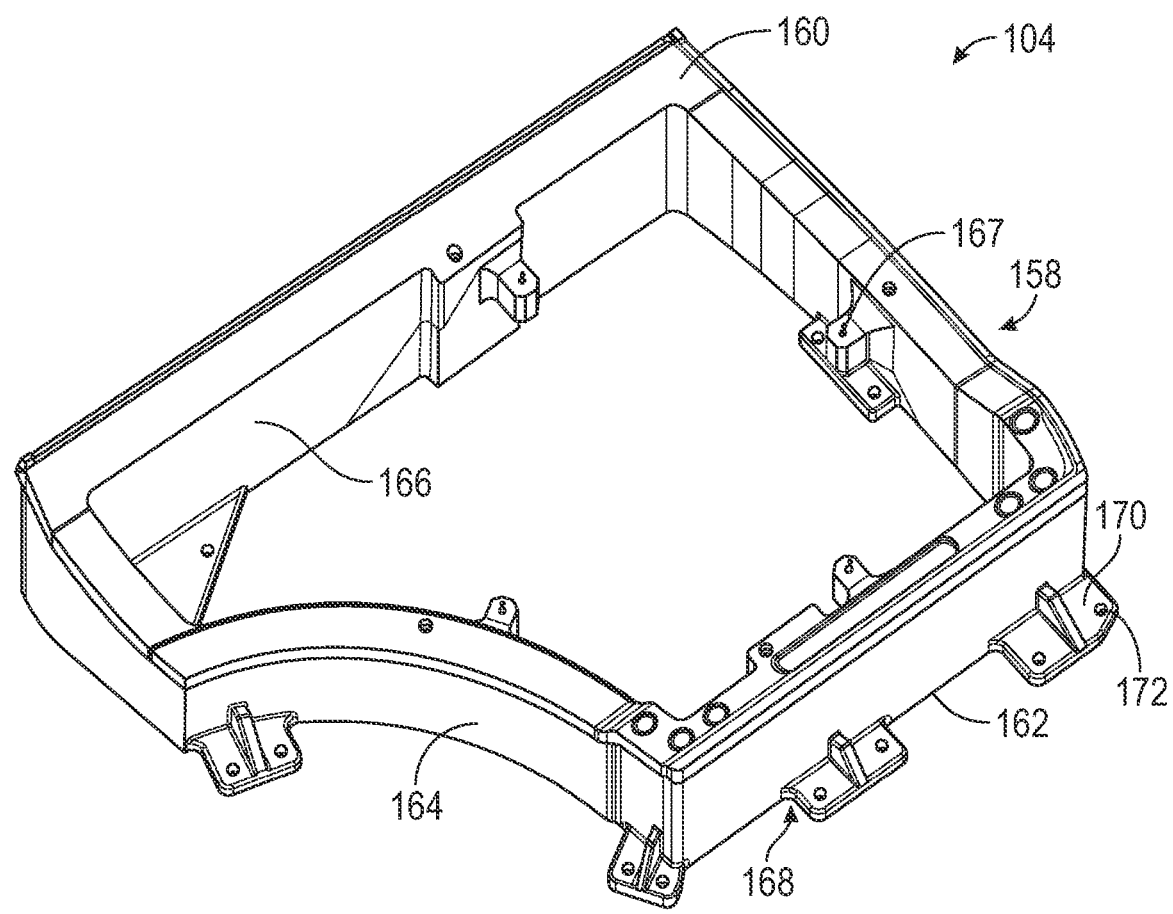
FIG. 5 is a perspective top view of a 3-D printed anvil, according to an exemplary embodiment.

FIG. 5 shows an exemplary anvil 104 disposed onto the work platform 112. In the embodiment shown, the anvil 104 includes an anvil body 158 having a first surface 160, a second surface 162 opposite the first surface 160, an external side surface 164 interconnecting the first surface 160 and the second surface 162, and an internal side surface 166 interconnecting the first surface 160 and the second surface 162. The first surface 160 defines a predetermined form factor, or shape, onto which a workpiece assembly rest. The internal side surface 166 defines a plurality of certification features 167 such as locator apertures or pins to properly locate the workpiece onto the anvil 104. It is preferable the first surface 160 is finished to a class-A finish. The second surface 162 defines a base 168 that sits on the first surface 116 of the work platform 112 and within the perimeter of the work platform 112.

The anvil 104 also includes a plurality of mounting feet 170 extending from the external and internal side surfaces 164, 166 adjacent the base 168. Each of the mounting feet 170 defines a mounting aperture 172 alignable with a through-hole 131 of the work platform 112 when the anvil 104 is placed on the first surface 116 of the work platform 112 in a predetermined position. A retainer bolt, pin, or clamp may be inserted through the aligned holes to firmly secure the anvil 104 to the work platform 112.

The anvil 104 is formed by an additive manufacturing process such as three-dimensional (3-D) printing, which is a process of making a 3D solid object of virtually any shape from a digital model. 3D printing is achieved using an additive process, where successive layers of material are laid down in different shapes. The anvil 104 may be 3-D printed of a polymer or polymer composite from a digital 3-D model. The polymer or polymer composite may be deposited, joined or solidified under computer control to create an anvil 104 having the desired form factor. The polymer/composite may be disperse, typically layer by layer, and fused by heat or light treatment. The polymer composite may include a carbon-fiber reinforced thermoplastic, preferably a nylon-12 together with a carbon fiber.

Best shown in FIG. 3 and FIGS. 6-8, are a plurality of unit tools 110 disposed onto the first surface 116 of the work platform 112. Each of the plurality of unit tools 110 includes a base 174A, 174B, 174C supporting a tool portion 176A, 176B, 176C. The unit tools 110 are re-arrangeable on the first surface 116 of the work platform 112. Each of the bases 174A, 1746, 174C defines a plurality of through-holes 178 or apertures 178 that are alignable with corresponding through-holes 122 of the work platform 112. Retaining bolts or pins may be inserted through the aligned through-holes 122, 178 to securely fix the unit tool 110 onto the work platform 112. A description of each of the functions of the tools are disclosed in detail below.

Show in FIG. 6 is a perspective side view of a pin and rest unit tool 110A. The pin and rest unit tool 110A is a stationary feature that locates a workpiece assembly in a predetermined location on the work platform 112. The pin and rest unit tool "pins" a dimensionally controlled hole in the inner panel. This enables repeatability of the part. A pin can be either a 2-way or 4-way. A 2-way controls the panel in 2 directions. A 4-way controls the panel in 4 directions. The rest unit allows the inner or outer panel to rest in a dimensionally controlled coordinate system. Shown in FIG. 7 is a perspective side view of a clamp unit tool 1106. A clamp unit is similar to a rest. A clamp unit tool 1106 is used as opposed to a rest when two parts need to be ensured that they are held tight together in selected areas of the panels. Shown in FIG. 8 is a perspective side view of a crowder unit tool 110C. The crowder unit tool is a mechanical device that is spring actuated. The crowder unit tool 110C is essentially a rough locater that centers the outer panel within the anvil 104 itself. The spring mechanism moves up and down as initiated by a maneuvering roller head thus allowing the roller head to hem while still keeping the panel centered.

The above disclosure provides a modular roller hemming system 100 that enables quick and economical changeovers of anvils 104 without the usual need of manufacturing a new base assembly 102, a new spider arm assembly 108, or new unit tools 110. A new or replacement anvil 104 may be manufactured by additive manufacturing in a fraction of the time that it would normally take to cast/forge and machine a traditional anvil.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A modular roller hemming system, comprising:
   a base assembly having a work platform, wherein the work platform defines a plurality of through-holes in a grid pattern;
   an anvil having a plurality of mounting feet, wherein at least one of the plurality of mounting feet defines a plurality of through-holes alignable with a corresponding plurality of through-holes of the work platform when the anvil is disposed on the work platform;
   a spider arm assembly spaced from the work platform, wherein the spider arm assembly includes a plurality of adjustable fingers that are configured to maintain the anvil on the work platform;

at least one support arm having a first end mountable to the base assembly and an opposite second end mountable to the spider arm assembly; and at least one repositionable tool unit having a foot pad defining a plurality of apertures alignable with a corresponding plurality of through-holes on the work platform.

2. The modular roller hemming system of claim 1,
wherein the base assembly includes a plurality of mounting brackets; and
wherein the first end is selectively mountable to any one of the mounting brackets of the base assembly.

3. The modular roller hemming system of claim 2, wherein the spider arm assembly comprise:
a frame structure having a plurality of interconnecting members; and
wherein the plurality of adjustable fingers extends from the interconnecting members, and
wherein at least one of the plurality of adjustable fingers is repositionable along the interconnecting members.

4. The modular roller hemming system of claim 3,
wherein the support arm comprises a first arm segment and second arm segment; and
wherein the first arm segment is selectively detachable from the second arm segment.

5. The modular roller hemming system of claim 1,
wherein the spider arm assembly includes a plurality of mounting brackets; and
wherein the second end is selectively mountable to any one of the mounting brackets of the spider arm assembly.

6. The modular roller hemming system of claim 1, wherein the anvil comprises:
a first surface defining a predetermined form factor to receive a workpiece assembly;
an second surface opposite the first surface, wherein the second surface defines a base; and
a first side surface interconnecting the first surface and the second surface, wherein the first side surface defines the at least one of the plurality of mounting feet.

7. The modular roller hemming system of claim 6, wherein the anvil further comprises:
a second side surface opposite the first side surface, wherein the second side surface defines a plurality of certification features.

8. The modular roller hemming system of claim 7, wherein the anvil further comprises a plurality of 3-D printed layers of a polymer composite.

9. The modular roller hemming system of claim 8, wherein the polymer composite comprises a Nylon-12 and a carbon fiber.

10. A modular roller hemming system, comprising
a work platform having a work surface, a support surface opposite the work surface, and a perimeter surface connecting the work surface and the support surface, wherein the work platform defines a plurality of through-holes in a grid pattern extending from the work surface to the support surface;
an anvil having first surface configured to receive a workpiece assembly, a base opposite the first surface, and at least one mounting foot extending from the base, wherein the at least one mounting foot defines at least one aperture alignable with at least one of the plurality of through-holes of the work platform;
a reconfigurable spider arm assembly having a plurality of adjustable fingers configured to retain the workpiece assembly against the first surface of the anvil;
a plurality of detachable support arms extending from the work platform and supporting the reconfigurable spider assembly; and
at least one tool unit having a foot pad defining a plurality of apertures alignable with a plurality of through-holes on the work platform.

11. The modular roller hemming system of claim 10, wherein the work platform includes a plurality of mounting brackets disposed about a perimeter of the work platform, wherein at least one of the plurality of detachable support arms is selectively attachable to any one of the mounting brackets.

12. The modular roller hemming system of claim 10, wherein the anvil and the at least one mounting foot comprises a plurality of layers of 3-D printed carbon-fiber reinforced thermoplastic.

13. The modular roller hemming system of claim 12, wherein the reconfigurable spider assembly comprises a frame structure, and wherein the plurality of fingers is repositionable along the frame structure.

* * * * *